United States Patent
Zhang et al.

(10) Patent No.: US 8,180,791 B2
(45) Date of Patent: May 15, 2012

(54) COMBINING STREAMING AND NAVIGATION FOR EVALUATING XML QUERIES

(75) Inventors: Ning Zhang, Belmont, CA (US); Thomas Baby, Foster City, CA (US); Sivasankaran Chandrasekar, Palo Alto, CA (US); Nipun Agarwal, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 417 days.

(21) Appl. No.: 11/937,357

(22) Filed: Nov. 8, 2007

(65) Prior Publication Data

US 2009/0125480 A1  May 14, 2009

(51) Int. Cl.
*G06F 7/00* (2006.01)

(52) U.S. Cl. ........................................ 707/769; 707/802

(58) Field of Classification Search .................. None
See application file for complete search history.

(56) References Cited

U.S. PATENT DOCUMENTS

| | | | |
|---|---|---|---|
| 6,282,537 B1 * | 8/2001 | Madnick et al. .................. 707/4 |
| 2004/0064466 A1 * | 4/2004 | Manikutty et al. ............. 707/100 |
| 2004/0267760 A1 * | 12/2004 | Brundage et al. ............. 707/100 |
| 2008/0222101 A1 * | 9/2008 | Beyer et al. ....................... 707/3 |

* cited by examiner

*Primary Examiner* — Tim T Vo
*Assistant Examiner* — Hasanul Mobin
(74) *Attorney, Agent, or Firm* — Hickman Palermo Truong Becker Bingham Wong LLP

(57) ABSTRACT

A query is rewritten to combine streaming evaluation and XML index evaluation. The query is rewritten to include a streaming operator (e.g. function) that, when executed, uses streaming evaluation. Further, the query is rewritten so that XML index evaluation of a path expression also produces location information that identifies the location of a node within an XML document. The streaming operator is able to exploit the location information to begin and end scanning rather than scanning the entire XML document.

16 Claims, 3 Drawing Sheets

Query QER

```
1   SELECT    "P"."C_04$" "NAME",
2             "P"."C_03$" "ID",
3             "P"."C_02$" "SALARY",
4             "P"."C_01$" "YEAROFBIRTH"
5   FROM      "SCOTT"."HUMAN_RESOURCE_T" "X2",
6             "SCOTT"."HR_PATHTAB" "SYS_P7",
7             "SCOTT"."HR_PATHTAB" "SYS_P0" ,
8             XPATHTABLE('.' PASSING
9                 SYS_MAKE_XMLNODEID(59975,3,"SYS_P0"."RID","S
10            YS_
11                P0"."PATHID","SYS_P0"."ORDER_KEY","SYS_P0"."VALUE",
12                "SYS_P0"."LOCATOR",1)
13            COLUMNS "C_00$" XMLTYPE PATH '.',
14                "C_01$" XMLTYPE PATH '/person/YearOfBirth',
15                "C_02$" XMLTYPE PATH '/person/salary',
16                "C_03$" XMLTYPE PATH '/person/@id',
17                "C_04$" XMLTYPE PATH '/person/name')   "P"
18  WHERE     "X2".ROWID="SYS_P0"."RID"
19            AND "SYS_P0"."PATHID"=HEXTORAW('7C51')
20            AND SYS_XMLI_LOC_ISNODE("SYS_P0"."LOCATOR")=1
21            AND "SYS_P7"."VALUE"='XDB'
22            AND "SYS_P7"."RID"="SYS_P0"."RID"
23            AND "SYS_P0"."ORDER_KEY"<"SYS_P7"."ORDER_KEY"
24            AND "SYS_P7"."ORDER_KEY"<SYS_ORDERKEY_
25                MAXCHILD("SYS_P0"."ORDER_KEY")
26            AND SYS_ORDERKEY_DEPTH("SYS_P0"."ORDER_KEY")+1=
27                SYS_ORDERKEY_DEPTH("SYS_P7"."ORDER_KEY")
28            AND "SYS_P7"."PATHID"=HEXTORAW('3070')
29            AND SYS_XMLI_LOC_ISNODE("SYS_P7"."LOCATOR")=1
```

FIG. 2

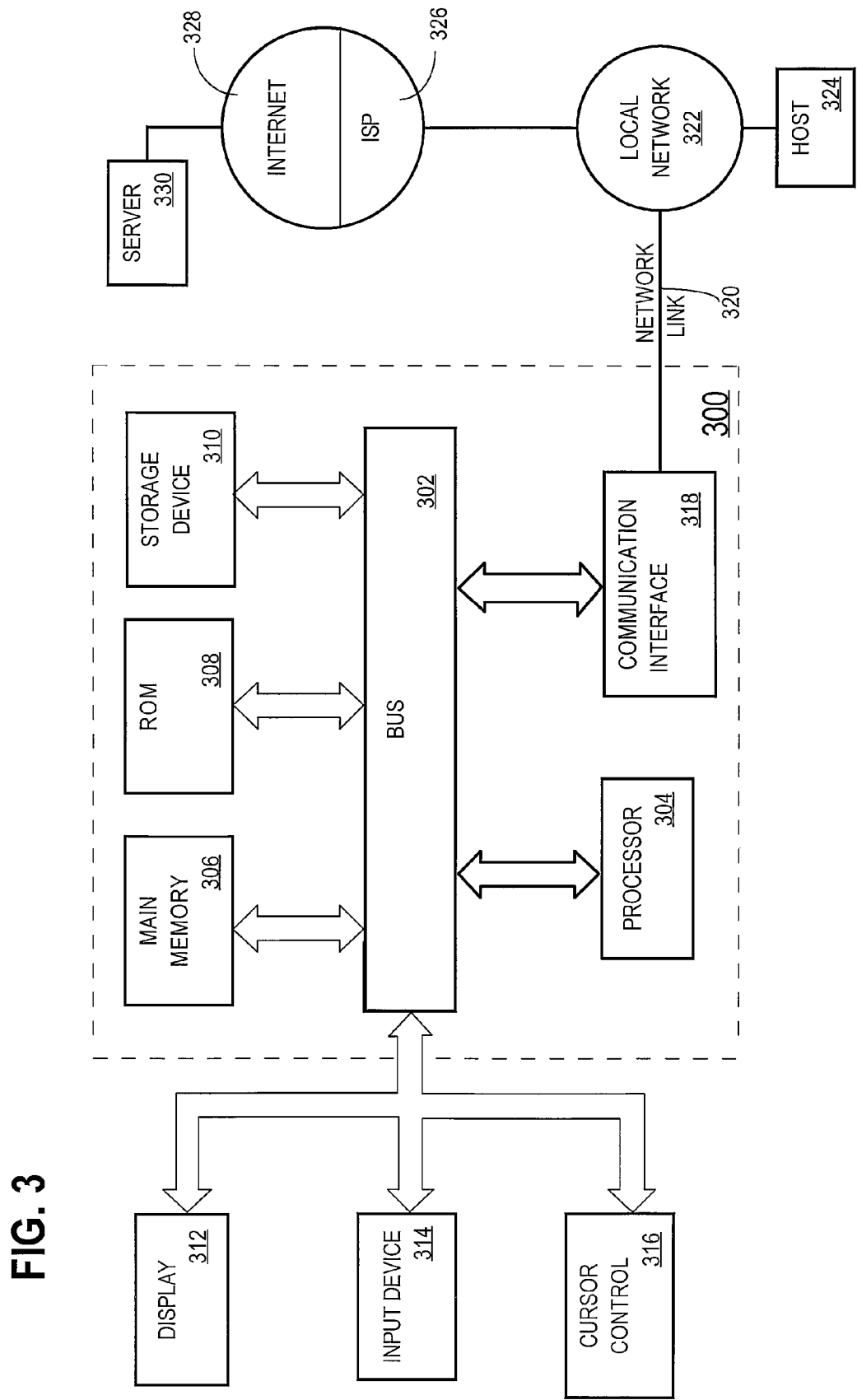

COMBINING STREAMING AND NAVIGATION FOR EVALUATING XML QUERIES

RELATED APPLICATIONS

This application is related to U.S. patent application Ser. No. 10/428,878, entitled Techniques For Rewriting XML Queries Directed To Relational Database Constructs, filed by Anand Manikutty, et al. on May 1, 2003, referred to hereafter as the "Rewrite Application", the contents of which are incorporated herein by reference as if originally set forth herein.

This application is related to U.S. patent application Ser. No. 11/100,083, entitled Providing XML Node Identity Based Operations In A Value Based SQL System, filed by Muralidhar Krishnaprasad et al. on Apr. 5, 2005, the contents of which are incorporated herein by reference as if originally set forth herein.

FIELD OF THE INVENTION

The present invention relates to computing queries that include path-based expressions.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The Extensible Markup Language (XML) is a standard for data and documents that has wide acceptance in the computer industry. Relational and object-relational database systems are enhanced to store and support query mechanisms for XML data.

It is important for such database systems to be able to execute an XQuery query or SQL query that embeds XML expressions, such as XPath and XQuery expressions. An expression is a component of a computer language statement that identifies a value or defines the computation of a value. Such a query received by the XML enhanced database systems maybe dynamically rewritten into an object-relational query that directly reference and access the underlying database objects (e.g. tables, columns, objects, object tables, LOBS) that store the XML data. This processing of rewriting is referred to herein as a relational rewrite.

Described herein are novel techniques for rewriting queries comprising expressions written in XPath or other XML language.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 depicts a rewritten query according to an embodiment of the present invention.

FIG. 3 depicts a computer system that may be used to implement an embodiment of the present invention.

DETAILED DESCRIPTION

Figure 1:
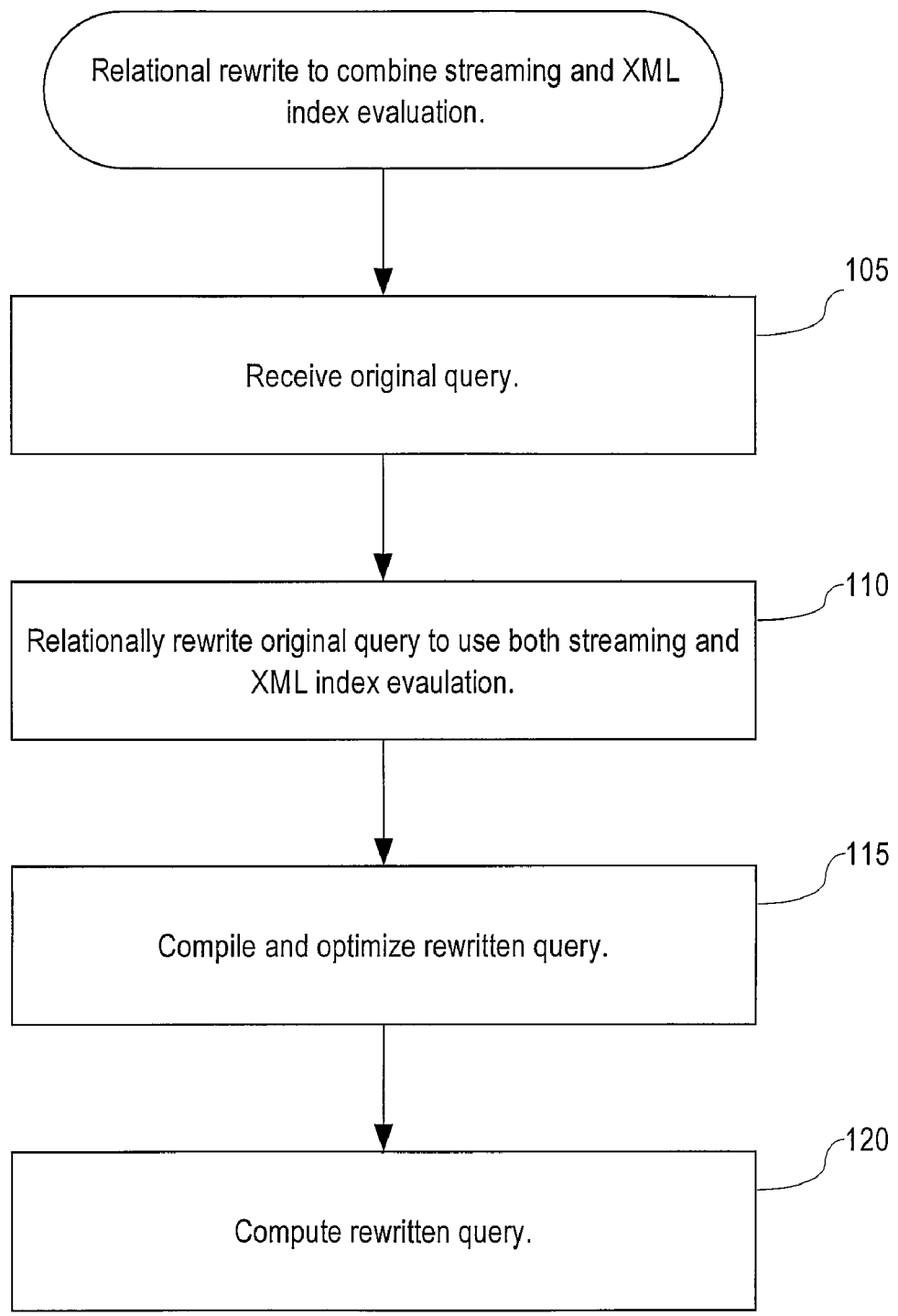
FIG. 1 is a diagram depicting a procedure for rewriting a query to use both XML index evaluation and streaming evaluation, according to an embodiment of the present invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

When a XPath query is rewritten it is rewritten to cause several types of evaluations to be performed to compute the expressions within the query. One type of evaluation is streaming evaluation. In streaming evaluation, a path expression is evaluated by scanning an XML document without generating an in-memory tree representation of the portion scanned or of the entire XML document. The output of the operator may be one or more tuples of the nodes (e.g. elements, element attributes) that satisfy the expression.

Yet another type of evaluation uses a specialized XML index. The indexes are scanned to retrieve nodes identified by the XPath expression. The nodes are returned by the operator. Choosing which type of operation to use for path expressions is critical to the overall performance.

The following query QE is used to illustrate.

```
SELECT
    ExtractValue(value(t1),'/person/name') name,
    ExtractValue(value(t1),'/person/@id') id,
    ExtractValue(value(t1),   '/person/salary') salary,
    ExtractValue(value(t1),   '/person/YearOfBirth')
    YearOfBirth
FROM
    human_resource_t X2,
    table(xmlsequence(extract(X2.doc,
    '/people/person'))) t1
WHERE ExtractValue(value(t1),   '/person/@group') = 'XDB';
```

Query QE selects from documents stored in table human_resource_t the names, IDs, salaries, and years-of-birth of all persons in the XDB group. QE specifies various path-based expressions. A path-based expression is an expression whose evaluation may entail evaluation of a path expression. Expression ExtractValue (value (t1), '/person/@group')='XDB' is a path-based expression because its evaluation requires evaluation of the path '/person/@group'. Likewise, extractvalue (value (t1), '/person/@group') is a path-based expression because the expression entails evaluation of the same path.

Using XML index evaluation is efficient when the selectivity of the path-based expression is high, only a few nodes in the XML documents are identified by the path expression and/or only a relatively few XML documents have nodes that satisfy the path expression. XML index evaluation can quickly locate these nodes without scanning a relatively lot of irrelevant nodes. On the other hand, if index evaluation for a query requires a large number of index lookups for each document of a relatively large set of documents (i.e. selectivity is low), index evaluation is less efficient.

For example, using XML index evaluation to evaluate the WHERE clause in QE can improve efficiency because the path/person/@group of the path-based expression in the WHERE clause identifies only one node in a document and many XML documents may not have node value 'XDB' for this node. On the other hand, the fact that Query QE has many path-based expression could entail many index lookups, resulting in lower efficiency.

Streaming evaluation may be more efficient for evaluating an XPath expression when the XPath expression is not selective, i.e. identifies a large set of nodes. However, streaming evaluation may not be more efficient for evaluating a single selective path expression since streaming evaluation scans all nodes in the document.

According to an embodiment, a query is rewritten to combine both types of evaluations. The query is rewritten to include a streaming operator (e.g. function) that, when executed, uses streaming evaluation. The streaming evaluation may use just one scan of an XML document to generate the sets of nodes identified by multiple path expressions. Further, the query is rewritten so that XML index evaluation of a path expression also produces location information that identifies the location of a node within an XML document. The streaming operator is able to exploit the location information to begin and end scanning rather than scanning the entire XML document.

Illustrative Operating Environment

According to an embodiment, queries are rewritten by query compilers of database servers. Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

A database comprises data and metadata that is stored on a persistent memory mechanism, such as a set of hard disks. Such data and metadata may be stored in a database logically, for example, according to relational and/or object-relational database constructs. Database metadata defines database objects, such as tables, object tables, views, or complex types, such as object types, and functions. SQL data definition language ("DDL") instructions are issued to a database server to create or configure database objects.

Generally, data is stored in a database in one or more data containers, each container contains records, and the data within each record is organized into one or more fields. In relational database systems, the data containers are typically referred to as tables, the records are referred to as rows, and the fields are referred to as columns. In object oriented databases, the data containers are typically referred to as object types or classes, the records are referred to as objects, and the fields are referred to as attributes. Other database architectures may use other terminology. Systems that implement the present invention are not limited to any particular type of data container or database architecture. However, for the purpose of explanation, the examples and the terminology used herein shall be that typically associated with relational or object-relational databases. Thus, the terms "table", "row" and "column" shall be used herein to refer respectively to the data container, record, and field.

The XML Index

According to one embodiment, an XML index is a domain index that improves the performance of queries that include XPath-based predicates and/or XPaths-based fragment extraction.

According to one embodiment, an XML index includes a PATH table, and a set of secondary indexes that index the entries in the PATH table. Each indexed XML document may include many indexed nodes. The PATH table contains one row per indexed node. For each indexed node, the row in the PATH table for the node contains various pieces of information associated with the node.

According to one embodiment, the information contained in each row of the PATH table includes (1) a PATHID that indicates the path to the respective node, (2) "node location data" for locating the fragment data for the respective node within the base structures, and (3) "hierarchy data" that indicates the position of the respective node within the structural hierarchy of the XML document that contains the respective node. Optionally, the PATH table may also contain node values for those nodes that are associated with values. The PATHID, node location data, hierarchy data, and node values may be stored in separate columns, any combination of which may be indexed by secondary indexes.

Relation Rewriting

One approach for executing XQuery/XPath queries is referred to herein as the "rewrite" approach, or as relational rewriting. XQuery/XPath queries received by an object-relational database server are dynamically rewritten to directly reference and access the underlying object-relational data. Specific techniques for implementing the rewrite approach are described in the above XQuery and XPath Translation and Rewrite Patent Applications.

Query Compiler and Execution Plans

After relational rewrite rewrites a query, the rewritten query is submitted to a query compiler. A query compiler parses a query and generates an execution plan. It performs query optimization involving transforming the query and/or generating an optimized execution plan. In general, transforming a query involves rewriting a query into another query that should produce the same result and that can potentially be executed more efficiently, i.e. one for which a potentially more efficient and less costly execution plan can be generated.

A query optimizer may generate one or more different candidate execution plans for a query, which are evaluated by the query optimizer to determine which should be used to compute the query.

Execution plans may be represented by a graph of interlinked plan operators, that each corresponds to an operation of an execution plan, referred to herein as an execution plan operation. Execution plan operations include, for example, a table scan, an index scan, hash-join, sort-merge join, nested-loop join, and filter. The hierarchy of the graphs represents the order in which the execution plan operations are performed and how data flows between each of the execution plan operations.

The one or more candidate execution plans may be generated for rewritten query. One candidate execution may use a particular index to access data, another may use another index or not event use an index. Candidate execution plans may be compared to select one that has been determined to be more efficient.

System-Defined Function as Operators

Relational rewrite includes rewriting queries to use expressions and operators not in the original query, and that are computed using streaming evaluation or XML index evaluation. According to an embodiment, a system-defined function is one not defined by a database language (e.g. SQL) but that is recognized in queries and computed by a database server. The implementation of a system-defined function may be hard coded within the native software of a database server, or the system-defined function may be registered with the database sever.

Registering a system-defined function refers to a database server receiving as input the definition of a user-defined function and configuring itself (e.g. generating metadata) to handle the user-defined functions when the functions appear in queries compiled by the database server. The definition may include the name of the function, arguments and return type of the function.

The definition may also include routine implementations (e.g. code, routines, function) called during query compilation, optimization, and computation to support use of the function. The routine implementations may include a routine invoked to perform execution plan operations that compute the function's output during query computation. The routine implementations may also include a routine for determining different ways of computing a system-defined function, or for generating query execution cost information.

According to an embodiment, a system-defined function receives as input tuples generated from XML evaluation, such as rows from an XML index. The each tuple is an index entry that indexes a node index within an XML document and contains location information about the XML document's location and the node's location within the document.

Another system-defined function uses the location information to perform streaming evaluation. The location information is used to determine where within an XML document to begin parsing and/or evaluating the document.

Rewriting to Combine Streaming and Index Evaluation

FIG. 1 depicts a procedure for compiling a query to use both XML index and streaming evaluation to compute the query, according to an embodiment of the present invention. The procedure may be executed by a database server, and is illustrated using query QE.

At block 105, the database server receives an original query.

At block 110, the query compiler relationally rewrites the original query, generating a rewritten query that uses XML index evaluation and streaming techniques. According to an embodiment of the present invention, heuristics are evaluated to determine whether and how to relationally rewrite the query.

For example, if a query has a single path-based expression in a WHERE clause predicate and path-based expressions in the SELECT clause, then the query is rewritten to use XML index evaluation to evaluate the predicate and streaming evaluation to evaluate the SELECT clause. Under this heuristic, query QE is rewritten to query QER, as shown in FIG. 2.

The relational rewrite QE is depicted in FIG. 2, which shows QER, the rewritten form of query QE. In QER, the WHERE clause is evaluated using XML index evaluation and the SELECT and FROM clauses are evaluated using streaming evaluation. The SQL/XML functions (ExtractValue, Extract, and ExistsNode) are evaluated using SQL expressions and a system-defined functions XPATHTABLE, performs streaming evaluation.

Lines 8-16 represent a rewrite of the SELECT-clause. During computation of XPATHTABLE, the four path-base expressions in 13-16 are evaluated together using streaming evaluation.

Lines 17 to 28 demonstrate a rewrite of the FROM and WHERE clauses in QE using expressions that are evaluated using XML index evaluation. Note that HR_PATHTAB is a path table name and SYS_P0 and SYS_P7 are both aliases for HR_PATHTAB. During the query computation of the rewritten query, if a tuple in the path table "SYS_P0" satisfies all the constraints specified in the WHERE clause, the tuple is passed to the SYS_MAKE_XMLNODEID function in line 9. The function generates location information in the form of node ids, which are used by XPATHTABLE as a starting point to begin scanning and parsing to evaluate the four paths using streaming evaluation.

At block 115, a query compiler compiles and optimizes QER. This operation entails generating an execution plan that may use an index scan of HR_PATHTAB, using a secondary index selected during query optimization by the query compiler.

At block 120, QER is computed by executing the execution plan. Execution of the execution plan includes calling the implementation routine of SYS_MAKE_XMLNODEID to compute node ids of tuples returned by an XML index evaluation, and of XPATHTABLE to perform streaming evaluation.

Hardware Overview

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to storage media and transmission media. Storage media includes both non-volatile media and volatile media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising:
   rewriting an original query into a rewritten query, said original query including:
      a first path-based expression that evaluates to first one or more values, and
      a second path-based expression;
   wherein the rewritten query includes a first rewritten expression that causes the first one or more values to be computed using streaming evaluation;
   wherein the rewritten query includes a second rewritten expression that corresponds to said second path-based expression;
   computing the first rewritten expression using a streaming evaluation;
   computing the second rewritten expression using XML index evaluation of an XML index that indexes nodes in a collection of XML documents, wherein each index entry of entries of said XML index contains location data that identifies a location of an element within a representation of an XML document of said collection of XML documents;
   wherein the second rewritten expression evaluates to an output for location information within a representation of a particular XML document, wherein said output of said second rewritten expression is an input to said first rewritten expression;
   wherein said location information is derived from location data from an entry in said XML index; and
   wherein computing the first rewritten expression includes using said location information to locate an element within said representation of said particular XML document using streaming evaluation.

2. The method of claim 1, wherein the location information specifies a location within an LOB storing said representation.

3. The method of claim 1, wherein the first expression is in a SELECT clause and the second expression is within a WHERE clause.

4. The method of claim 1, wherein the first rewritten expression includes an expression that evaluates to a system-defined function not prescribed by a database language.

5. The method of claim 1, wherein after rewriting, a query optimizer compiling said rewritten query, said compiling including selecting a secondary index to use to compute said second rewritten expression.

6. A computer-implemented method comprising:
   a database server rewriting an original query into a rewritten query, said original query including:

a first path-based expression in a SELECT clause that evaluates to first one or more values, and
second path-based expressions in both a FROM clause and a WHERE clause;
wherein the rewritten query includes a first rewritten expression that causes the first one or more values to be computed using streaming evaluation;
wherein the rewritten query includes second rewritten expressions that correspond to said second path-based expressions;
said database server computing the first written expression using streaming evaluation;
said database server computing the second rewritten expressions using XML index evaluation of an XML index that indexes nodes in a collection of XML documents, wherein each index entry of entries of said XML index contains location data that identifies a location of an element within a representation of an XML document of said collection of XML documents;
wherein the second rewritten expression evaluates to an output for location information within a representation of a particular XML document, wherein said output of said second rewritten expression is an input to said first rewritten expression, wherein said location information is derived from location data from an entry in said XML index; and
wherein computing the first rewritten expression includes using said location information to locate an element within said representation of said particular XML document using streaming evaluation.

7. The method of claim 6, wherein computing the first rewritten expression includes using said location information to locate an element within said representation.

8. The method of claim 6, wherein after rewriting, a query optimizer compiling said rewritten query, said compiling including selecting a secondary index to use to compute said second rewritten expressions.

9. A non-transitory computer-readable storage medium storing one or more sequences of instructions, wherein execution of the one or more sequences of instructions by one or more processors causes the one or more processors to perform the steps of:
rewriting an original query into a rewritten query, said original query including:
a first path-based expression that evaluates to first one or more values, and
a second path-based expression;
wherein the rewritten query includes a first rewritten expression that causes the first one or more values to be computed using streaming evaluation;
wherein the rewritten query includes a second rewritten expression that corresponds to said second path-based expression;
computing the first rewritten expression using a streaming evaluation;
computing the second rewritten expression using XML index evaluation of an XML index that indexes nodes in a collection of XML documents, wherein each index entry of entries of said XML index contains location data that identifies a location of an element within a representation of an XML document of said collection of XML documents;
wherein the second rewritten expression evaluates to an output for location information within a representation of a particular XML document, wherein said output of said second rewritten expression is an input to said first rewritten expression, wherein said location information is derived from location data from an entry in said XML index; and
wherein computing the first rewritten expression includes using said location information to locate an element within said representation of said particular XML document using streaming evaluation.

10. The non-transitory computer-readable storage medium of claim 9, wherein the location information specifies a location within an LOB storing said representation.

11. The non-transitory computer-readable storage medium of claim 9, wherein the first expression is in a SELECT clause and the second expression is within a WHERE clause.

12. The non-transitory computer-readable storage medium of claim 9, wherein the first rewritten expression includes an expression that evaluates to a system-defined function not prescribed by a database language.

13. The non-transitory computer-readable storage medium of claim 9, the steps further including:
after rewriting, a query optimizer compiling said rewritten query, said compiling including selecting a secondary index to use to compute said second rewritten expression.

14. A non-transitory computer-readable storage medium carrying one or more sequences of instructions, wherein execution of the one or more sequences of instructions by one or more processors causes the one or more processors to perform the steps of:
a database server rewriting an original query into a rewritten query, said original query including:
a first path-based expression in a SELECT clause that evaluates to first one or more values, and
second path-based expressions in both a FROM clause and a WHERE clause;
wherein the rewritten query includes a first rewritten expression that causes the first one or more values to be computed using streaming evaluation;
wherein the rewritten query includes second rewritten expressions that correspond to said second path-based expressions;
said database server computing the first written expression using streaming evaluation;
said database server computing the second rewritten expressions using XML index evaluation of an XML index that indexes nodes in a collection of XML documents, wherein each index entry of entries of said XML index contains location data that identifies a location of an element within a representation of an XML document of said collection of XML documents;
wherein the second rewritten expression evaluates to an output for location information within a representation of a particular XML document, wherein said output of said second rewritten expression is an input to said first rewritten expression, wherein said location information is derived from location data from an entry in said XML index; and
wherein computing the first rewritten expression includes using said location information to locate an element within said representation of said particular XML document using streaming evaluation.

15. The non-transitory computer-readable storage medium of claim 14, wherein computing the first rewritten expression includes using said location information to locate an element within said representation.

16. The non-transitory computer-readable storage medium of claim 14, the steps further including:
after rewriting, a query optimizer compiling said rewritten query, said compiling including selecting a secondary index to use to compute said second rewritten expressions.

* * * * *

UNITED STATES PATENT AND TRADEMARK OFFICE
CERTIFICATE OF CORRECTION

| | | |
|---|---|---|
| PATENT NO. | : 8,180,791 B2 | Page 1 of 1 |
| APPLICATION NO. | : 11/937357 | |
| DATED | : May 15, 2012 | |
| INVENTOR(S) | : Zhang et al. | |

It is certified that error appears in the above-identified patent and that said Letters Patent is hereby corrected as shown below:

On sheet 1 of 3, in figure 1, Box No. 110, line 2, delete "evaulation." and insert -- evaluation. --, therefor.

In column 4, line 60, delete "sever." and insert -- server. --, therefor.

In column 5, line 19, delete "XMLdocument" and insert -- XML document --, therefor.

Signed and Sealed this
Thirty-first Day of July, 2012

David J. Kappos
*Director of the United States Patent and Trademark Office*